United States Patent [19]

Baker

[11] Patent Number: 5,401,050
[45] Date of Patent: Mar. 28, 1995

[54] MACHINERY TRANSPORT TRAILER

[76] Inventor: James H. Baker, 113 N. Brandt, Spearman, Tex. 79081

[21] Appl. No.: 71,784

[22] Filed: Jun. 4, 1993

[51] Int. Cl.$^6$ ............................................. B62D 63/06
[52] U.S. Cl. ..................... 280/656; 280/789; 296/182
[58] Field of Search ................. 280/423.1, 441.2, 638, 280/656, 789, 796, 798, 799, 800, DIG. 8; 296/181, 182, 183

[56] References Cited

U.S. PATENT DOCUMENTS

| | | | |
|---|---|---|---|
| 3,191,962 | 6/1965 | Coordes | 280/423.1 X |
| 3,892,423 | 7/1975 | Smith | 280/441.2 X |
| 4,077,650 | 3/1978 | Leach, Jr. | 280/423.1 |
| 4,881,859 | 11/1989 | Ehrlich | 280/789 X |

FOREIGN PATENT DOCUMENTS 1576378  7/1990  U.S.S.R. .............. 280/441.2

Primary Examiner—Margaret A. Focarino
Assistant Examiner—Victor E. Johnson
Attorney, Agent, or Firm—Reising, Ethington, Barnard, Perry & Milton

[57] ABSTRACT

The machinery transport trailer (10) includes a main frame (12) with a pair of fore and aft extending parallel beams (34 and 36). A pair of axle assemblies (14) support the rear of the main frame (12) transverse beams (22) are attached to the bottom of the main frame (12) to provide a support platform. A torque tube (48) is attached to the front ends of the parallel beams (34 and 36) of the main frame (12). A goose neck (16) with right and left beam assemblies and a transverse frame member 58 are connected to the torque tube (48). The goose neck (16) defines an open area (66) which is sufficiently wide to allow the elevator of a combine harvester separator 24 that is being transported to pass between the right and left beam assemblies and to allow the front wheels 30 of a combine harvester separator to move forward to a position at the front of the main frame 12.

11 Claims, 2 Drawing Sheets

MACHINERY TRANSPORT TRAILER

BACKGROUND OF THE INVENTION

1. Technical Field

The invention relates to a trailer for transporting large bulky machinery and more specifically to a trailer for transporting agricultural combine harvesters.

2. Background Art

Machinery has in some cases been miniaturized over the years. In other cases it has been increased in size to provide increased capacity. The increase in size to increase capacity has been especially common in agricultural machinery. As the number of people engaged in farming has decreased, each farmer has had to produce more and more food to feed the population. Tractors have had increases in pulling power with little change in the physical size and in some cases with a decrease in physical size. Agricultural tillage tools and harvesting equipment have had drastic increases in size and capacity over the years. To increase the quantity of crop material harvested in an hour it is usually necessary to increase the physical size of machines for harvesting and treating crop material.

One of the most striking examples of the changes of agricultural machinery capacity and size is the agricultural combine harvesters for harvesting and threshing grain crops. The capacity of individual combine harvesters has increased by a factor of four or more in the last 20 to 30 years while the weight has more than doubled. Combine harvesters currently manufactured in North America, with a harvesting header or table removed, are about thirteen feet wide, over twelve feet high, more than twenty feet long and weigh over 23,000 pounds with the grain tank empty.

The need to transport combine harvesters from one field to another has increased as capacity has increased. Their capacity and cost has exceeded what many farmers can justify in view of government policy to have low food prices. Individual farmers also find it difficult or impossible to employ the number of people required to staff a harvesting operation. As a result many farmers have their crops harvested by professional harvesters that travel from farm to farm.

The transportation infrastructure has not kept up with the need to move large harvesting machines efficiently and safely. Railroad transportation systems have not been able to adapt to the changing requirements. Road network have been changed to meet the new requirements by increasing road widths, bridge widths and overhead clearances. However, increased regulation concerning weights and weight distribution have not adapted to changing demands. The weight limitations for truck axles have remained virtually unchanged. It has been nearly impossible to move two combine harvester separators on one trailer without exceeding the maximum weight limitations on the rear trailer axles.

SUMMARY OF THE INVENTION

An object of the invention is to provide a trailer for transporting one or two combine harvester separators with improved weight distribution.

A further object of the invention is to provide a trailer for transporting one or two combine harvester separators Which allows the combine harvester separators to be moved forward toward a towing vehicle from the usual position.

The trailer includes a main frame, one or more axles with wheels and tires supporting the rear of the main frame of the trailer, a goose neck with a hitch pin attached to the front of the trailer mainframe for attaching the trailer to a highway type tractor fifth wheel and a platform formed by beams attached to the main frame for supporting a combine harvester separator. The goose neck is attached to the front of the main frame. The goose neck includes a right side beam and a left side beam that are spaced apart and attached to the main frame, that extend upwardly from the main frame, and that extend forwardly from the main frame. A hitch pin is attached to the underside of a transverse frame assembly that extends from the forward portion of the right side beam to the forward portion of the left side beam. The goose neck defines an open area that extends forward from the main frame to the transverse frame assembly, from the right side beam to the left side beam, and from the ground up. The right side beam and the left side beam are spaced apart a distance sufficient to allow a portion of the combine harvester separator to move into the open area defined by the goose neck and to thereby move the combine harvester closer to the hitch pin. This shifts the weight toward the hitch pin and away from the rear of the trailer. By shifting the weight forward more weight is supported by the highway tractor attached to the hitch pin and less weight is supported by the axles and wheels at the rear of the trailer, without increasing the length of the trailer.

The foregoing and other objects, features and advantages of the present invention will become apparent in the light of the following detailed description of exemplary embodiments thereof, as illustrated in the accompanying drawing.

DETAILED DESCRIPTION OF PREFERRED EMBODIMENTS

Figure 1:
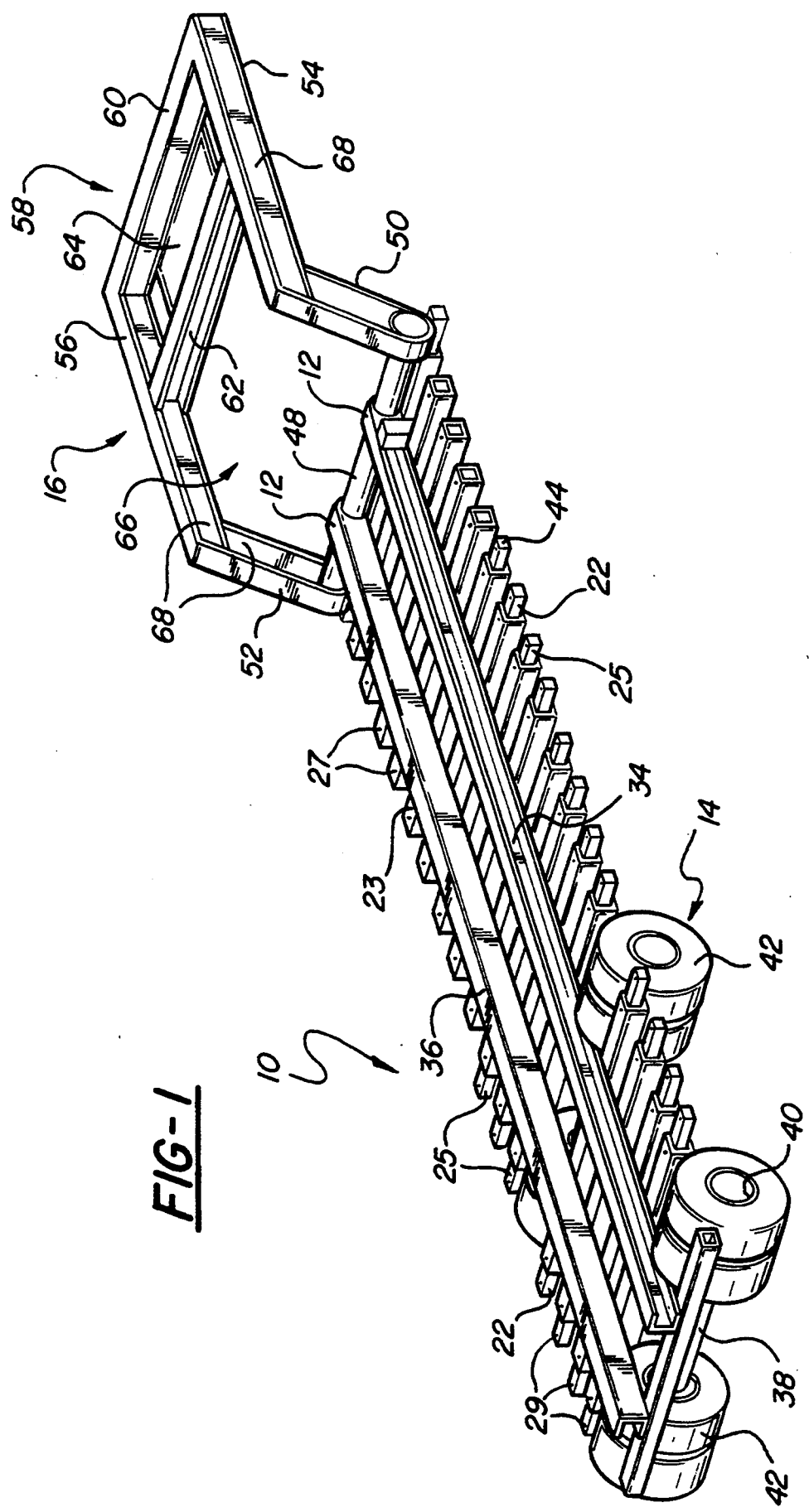
FIG. 1 is a perspective view of the machine transport trailer.

The machinery transport trailer 10 includes a main frame 12, one or more axle assemblies 14 supporting the rear of the trailer, a goose neck 16 with a hitch pin 18 attached to the front of the trailer for attaching the trailer to a highway type tractor fifth wheel 20, and transverse beams 22 attached to the main frame 12 for supporting machinery transported by the trailer. The machinery transport trailer 10, as shown, is specifically for transporting agricultural combine harvester separators 24, a portion of one of which is shown in phantom in FIGS. 2 and 3. These combine harvesters are used to harvest most grains grown in North America. They harvest crops such as eatable beans, soybeans, barley, corn, rye, sun flowers and wheat. The separator portion of the machine threshes, separates, cleans and temporarily stores the grain and can accommodate all of the above listed crops with adjustments that are provided. Combine harvesters have a header that attaches to the front portion 26 of an elevator 28. Different headers are attached to the elevator 28 for different crops. Some headers sever crop material from the ground and feed the crop material to the elevator 28. Other headers lift crop material from the ground that has been severed by another machine. It is common practice to use five different headers with one combine. Combine harvester separators 24 are designed to use various headers. These headers can be disconnected from the elevator 28 in seconds. Headers are transported separate from the combine harvester separators 24 any time the machines are moved more than a few miles. A typical combine harvester separator 24 manufactured in North America today weighs around 23,000 pounds with the header removed and the grain tank empty. The machine is over twelve feet high and twenty feet long. The large front wheels 30 which propel the machine and support most of the weight have an overall width in excess of twelve feet. The inside space between the front wheels 30 exceeds seven feet. Approximately sixty five percent of the total weight of a combine harvester separator 24 is supported by the front wheels 30. The rear portion of the combine harvester separator is supported by relatively small wheels that are steerable. The elevator 28 includes an elevator housing 32 for a crop conveyor assembly. The rear portion of the elevator housing 32 is pivotally attached to the frame of the combine harvester separator 24. The elevator housing 32 is pivoted by hydraulic cylinders to raise and lower a header attached to the front portion 26 of the elevator 28. The elevator housing 32 is about five feet wide on high capacity combine harvester separators 24.

The main frame 12 of the machinery transport trailer 10 has a right side fore and aft extending channel 34 and a left side fore and aft extending channel 36. The channels 34 and 36 could be I-beams or rectangular tubes as well as channels if desired.

Each axle assembly 14 supporting the rear portion of the machinery transport trailer 10 includes a rigid axle 38 and two wheels 40 and tires 42 rotatably journaled on each of its ends. Two axle assemblies 14 are shown in FIG. 1. Two axle assemblies 14 are required if two combine harvester separators 24 are transported on the machinery transport trailer 10. One axle assembly 14 may be sufficient if only one combine harvester separator 24 is transported on the machinery transport trailer 10. Each axle assembly 14 is attached to the main frame 12. An axle assembly 14 is normally attached to the main frame 12 by a suspension system (not shown) but could be rigidly attached if desired. Suspension systems with leaf springs and suspension systems with pivoted arms and air bags are commonly used on similar trailers.

Transverse beams 22 are attached to the bottom of the main frame 12 by welding. The transverse beams 22, as shown, are square tubes. Each transverse beam 22 has a center section 23 and two end sections 25. The center section 23 is about eight feet long and telescopically receives the end sections 25. The transverse beams 22 for transporting the combine harvester separator 24 described above are about twelve feet long with the end sections 25 extended. When the machinery transport trailer is being moved without a load, the end sections 25 can be telescopically moved further into the center sections 23 to reduce the length of the transverse beams 22 to the legal limit. Pins 27 are inserted into aligned holes 29 in the center section 23 and in the end sections 25 to set and maintain the total length of the transverse beams 22. The transverse beams 22 are spaced along the length of the main frame 12 on nineteen inch centers to provide a platform upon which the wheels 30 of a combine harvester separator 24 can run. The transverse beams 22 are sufficiently close to the ground to keep the height of the combine harvester separator 24 well below fifteen feet when it is loaded on the machinery transport trailer 10. The wheels 30 of the combine harvester separator 24 contact and climb over the tires 42 that support the machinery transport trailer 10 during loading and unloading of the machinery transport trailer 10. The axle assemblies 14 must be positioned so that the rear wheels of both combine harvester separators 24 can be positioned on the beams 22. The free ends of the transverse beams 22 can be closed by steel caps 44 that are parallel to the channels 34 and 36 of the main frame 12 and close the outer ends of end sections 25 of the transverse beams 22.

A goose neck 16 at the front of the machinery transport trailer 10 includes a large transverse horizontal torque tube 48. The torque tube 48 is attached to the forward ends of the right and left side fore and aft extending channels 34 and 36 of the main frame 12. A large right side I-beam 50 is secured to the right hand end of the transverse horizontal torque tube 48. A large left side I-beam 52 is secured to the left hand end of the transverse horizontal torque tube 48. Both the large right side I-beam 50 and the large left side I-beam 52 extend upwardly and forwardly from the transverse horizontal torque tube 48 and are in spaced apart vertical planes that are parallel to the long axies of the channels 34 and 36 of the main frame 12. A generally horizontal I-beam 54 is secured to the upper end of the large right side I-beam 50 and extends forwardly parallel to the long axis of the channel 34. A generally horizonal I-beam 56 is secured to the upper end of the large left side I-beam 52 and extends forwardly parallel to the long axis of the channel 36. A fabricated horizontal transverse frame member 58 is attached to the forward ends of the generally horizontal I-beams 54 and 56. The fabricated horizontal transverse frame member 58 includes a front I-beam 60, a rear I-beam 62, and a horizontal plate 64 attached to the bottom of both the front I-beam 60 and the rear I-beam 62. A hitch pin 18 is secured to the bottom of the horizontal plate 64 half way between the generally horizontal I-beams 54 and 56. The large right side and left side I-beams 50 and 52 and the generally horizontal I-beams 54 and 56 are boxed in by heavy flat plates 68 to form strengthened tubular beams with a rectangular cross section.

The goose neck 16 is preferably between seven feet and eight feet six inches wide. The overall length of the goose neck 16 is about nine feet. A large open area 66 is defined by the goose neck 16 and extends from the transverse horizontal torque tube 48 to the fabricated horizontal transverse frame member 58 with hitch pin 18, from the large right side I-beam 50 and the generally horizontal I-beam 54 to the large left side I-beam 52 and the generally horizontal I-beam 56, and from the ground up. The large open area 66 is over six feet wide and over five feet from front to rear. This large open area 66 is available to be shared by machinery being transported on the machinery transport trailer 10 and by the rear of a highway tractor 70.

Figure 2:
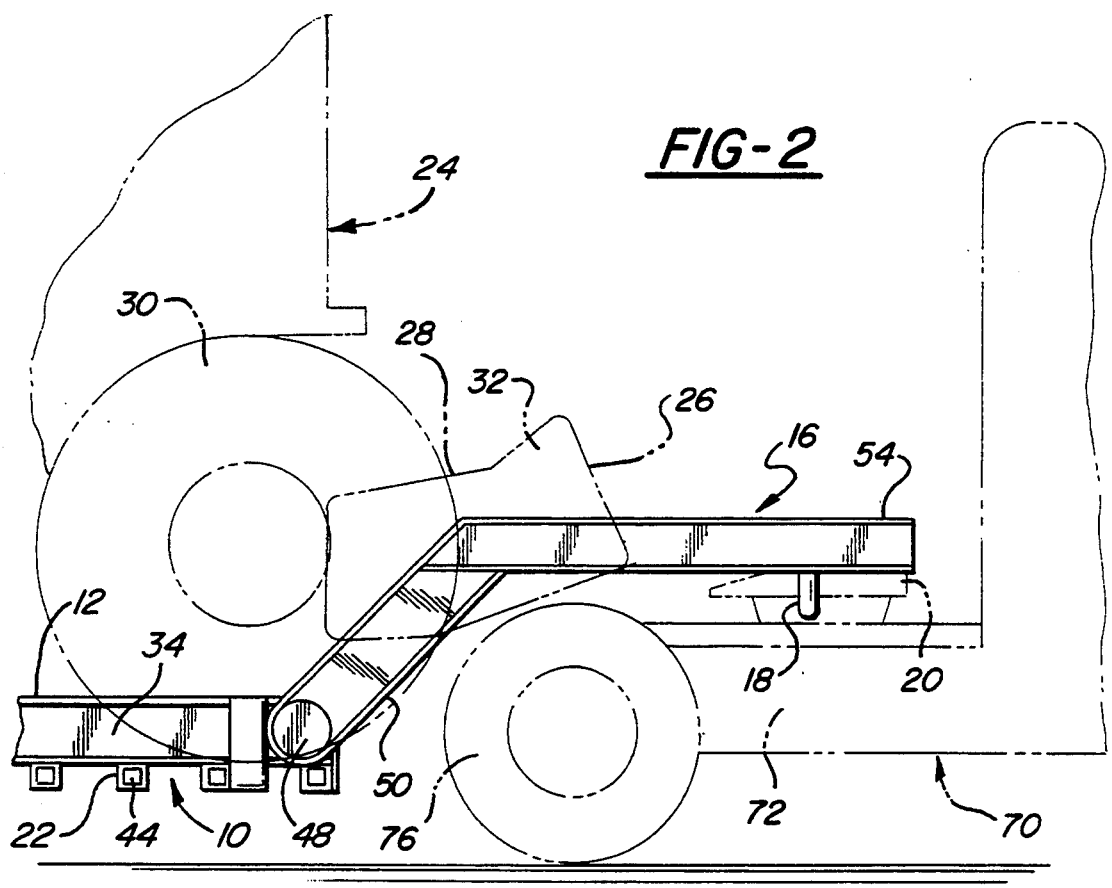
FIG. 2 is an enlarged side elevational view of the front portion of the machinery transport trailer with a portion of a combine harvester shown in phantom and a portion of a highway tractor shown in phantom.
Figure 3:
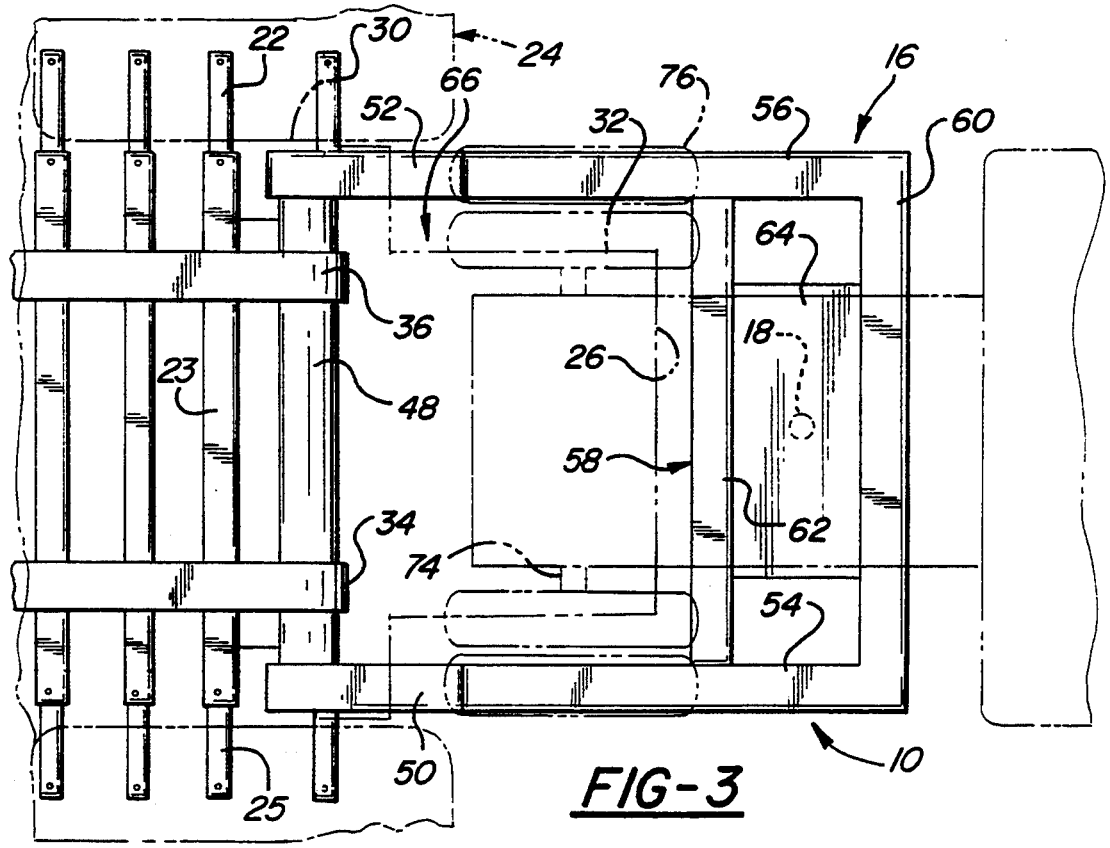
FIG. 3 is a plan view of the portion of the machinery transport trailer shown in FIG. 2.

The highway tractor 70, as shown in FIGS. 2 and 3, has a frame 72 and a rear axle 74 with dual tires and wheels 76 on each side. A fifth wheel 20 is attached to the frame 72 for connecting the hitch pin 18 to the highway tractor 70. Fifth wheels 20 can be moved to various locations on the frame 72 of the highway tractor 70 to obtain the desired weight distribution on the highway tractor. The fifth wheel 20 as shown in FIGS. 2 and 3 is in about the correct position for a highway tractor 70 with two rear axles and with the rear axle 74 being the rear most axle. The tires and wheels 76 extend as far or farther into the open area 66 defined by the goose neck 16 as the tires and wheels of any highway tractor would extend. The wheels and tires 76 and the frame 72, even in this extreme rear position as shown in FIGS. 2 and 3, leave substantial space for the housing 32 of an elevator 28 for a combine harvester separator 24. Utilization of a portion of a open area 66 formed by the goose neck 16 makes it possible to move the combine harvester separator 24 forward several feet thereby transferring weight to the fifth wheel 20 and the highway tractor 70. By moving the combine harvester separator 24 forward to the position shown in FIGS. 2 and 3 it is possible to transport two combine harvester separators on one machinery transport trailer 10 without overloading the two axle assemblies 14, shown in FIG. 1, attached to and supporting the rear of the trailer. If the front combine harvester separator 24 is moved forward, a rear combine harvester separator can also be moved forward. The open area 66 defined by the goose neck 16 also makes it possible to employ a shorter machinery transport trailer 10 with one axle assembly 14, for transporting a single combine harvester separator 24, than would otherwise be required. It is not possible to obtain the desired weight distribution by increasing the length of the machinery transport trailer 10 for transporting two combine harvester separators 24. Such an increase in length would increase trailer weight and may violate rules concerning trailer length.

Preferred embodiments of the invention have been described in detail but are examples only and the invention is not restricted thereto. It will be easily understood by those skilled in the art that modifications and variations can easily be made within the scope of this invention.

I claim:

1. A machinery transport trailer, for transporting large machinery, including a main frame with a rear portion and a front portion; at least one axle assembly connected to and supporting the rear portion of the main frame; a machinery support platform attached to the main frame, said machinery support platform having a center section supporting laterally adjustable side sections for adjusting the width of the machinery support platform; and a goose neck including a right side beam assembly attached to the front portion of the main frame that extends upwardly and forwardly from the main frame, a left side beam assembly attached to the main frame that extends upwardly and forwardly from the main frame and is spaced from the right side beam assembly, a transverse frame member attached to a forward portion of the right side beam assembly and a forward portion of the left side beam assembly, a hitch pin for attaching the machinery transport trailer to a fifth wheel attached to the transverse frame member, and wherein the goose neck defines an open area that extends from the right side beam assembly to the left side beam assembly and from the main frame to the transverse frame member and vertically downward from a horizontal plane above said gooseneck to a trailer support surface, the machinery support platform has a width that exceeds the outside width of the goose neck when transporting large machinery and wherein the open area can receive a portion of a machine that is transported by the machinery transport trailer and other portions of a machine that is being transported can be spaced apart a distance that exceeds the outside width of the goose neck and extend forward of the attachment point between the main frame and the goose neck.

2. A machinery transport trailer, as set forth in claim 1, wherein the open area defined by the goose neck has a width between the right side beam assembly and the left side beam assembly that exceeds five feet.

3. A machinery transport trailer, as set forth in claim 1, wherein the open area defined by the goose neck has a length from the main frame to the transverse frame member that exceeds five feet.

4. A machinery transport trailer, as set forth in claim 1, wherein the right side beam assembly and the left side beam assembly of the goose neck are generally parallel to each other.

5. A machinery transport trailer, as set forth in claim 1 wherein the main frame includes a pair of fore and aft extending parallel beams each of which has a forward end and a trailing end and a transverse horizontal torque tube secured to the forward ends of the fore and aft extending parallel beams of the main frame and wherein the right side beam assembly of the goose neck is attached to the transverse horizontal torque tube to the right of the fore and aft extending parallel beams of the main frame, the left side beam assembly of the goose neck is attached to the transverse horizontal torque tube to the left of the fore and aft extending parallel beams of the main frame and the left side beam assembly and the right side beam assembly of the goose neck are parallel to each other.

6. A machinery transport trailer, as set forth in claim 5, wherein the right side beam assembly of the goose neck includes a large right side beam attached to the transverse horizontal torque tube and extending upwardly and forwardly from the main frame and a generally horizontal beam secured to an upper end and extending forwardly from the large right side beam and wherein the left side beam assembly of the goose neck includes a large left side beam attached to the transverse horizontal torque tube and extending upwardly and forwardly from the main frame and a generally horizontal beam secured to an upper end and extending forwardly from the large left side beam.

7. A machinery transport trailer, as set forth in claim 1, including two axle assemblies connected to and supporting the rear portion of the main frame.

8. A machinery transport trailer, as set forth in claim 1, wherein the open area defined by the goose neck is adapted to receive a portion of the elevator of a combine harvester separator.

9. A machinery transport trailer, as set forth in claim 1 wherein the machinery support platform includes a plurality of transverse beams attached to the main frame and each transverse beam includes a center section and two end sections releasably secured to the center section, said end sections forming said laterally adjustable side sections.

10. A machinery transport trailer as set forth in claim 9 wherein the end sections of the transverse beams are telescopically connected to the center sections and are slidable toward the center sections to reduce the width of the machinery support platform when the trailer is unloaded.

11. A machinery transport trailer, as set forth in claim 10 wherein pins pass through apertures in the center sections and aligned apertures in the end sections of the transverse beams to prevent telescopic movement of the end sections relative to the center sections.

* * * * *